Patented July 8, 1952

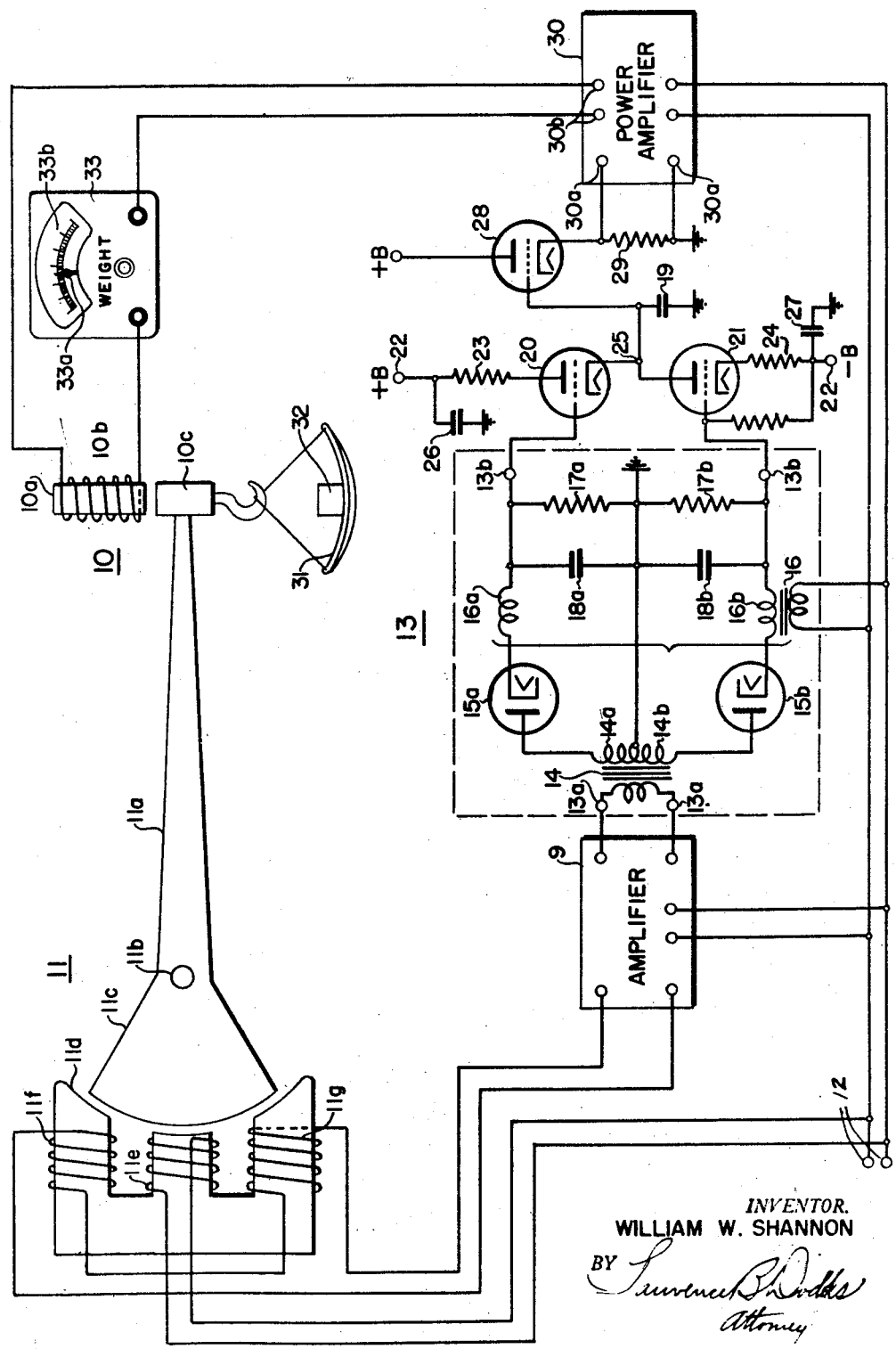

2,602,660

UNITED STATES PATENT OFFICE 2,602,660

REBALANCING ELECTROMAGNETIC SERVO SYSTEM

William W. Shannon, Glen Cove, N. Y., assignor to Fairchild Camera and Instrument Corporation, a corporation of Delaware Application September 6, 1946, Serial No. 695,329

12 Claims. (Cl. 265—70)

This invention relates to rebalancing electromagnetic servo systems and, while it is of general application, it is particularly suitable for embodiment in a rebalancing automatically indicating scale and will be specifically described in such an application.

Heretofore there have been proposed various types of electrically operated automatic indicating scales. However, the majority of these scales have been of the deflection type, that is, a type in which the application of a weight unbalances a normally balanced system and the amount of unbalance is indicated as a measure of the applied weight. The principal disadvantage of this type of scale is the difficulty of designing a system in which the response is linear with respect to weight over the complete deflection range. It is also difficult to obtain a wide deflection range and substantially uniform sensitivity over the range.

There have also been proposed certain so-called automatic rebalancing electromagnetic scales, but these have not met with commercial success due to a number of disadvantages and limitations. For example, while they have generally been of the rebalancing type, they have also been of the position type, that is, a type in which a deviation of the system from the balance point initiates a correcting action which tends to reduce such deviation but never eliminates it completely, since such elimination would remove the correcting action necessary to maintain the balance under the new condition. In other words, systems of this type have been subject to a substantial and undesirable regulation characteristic.

It is an object of the present invention, therefore, to provide a new and improved rebalancing electromagnetic servo system which avoids one or more of the above-mentioned disadvantages and limitations of the prior art systems.

It is another object of the invention to provide a new and improved automatically indicating rebalancing scale which obviates one or more of the above-mentioned disadvantages and limitations of the prior art automatically indicating scales.

It is a further object of the invention to provide a new and improved automatically indicating rebalancing scale in which there is developed automatically an indication accurately and linearly representative of the applied weight.

It is a still further object of the invention to provide a new and improved automatically indicating rebalancing scale in which the scale is always accurately rebalanced to its normal or neutral position and in which the magnitude of the correction effect necessary to rebalance the scale is accurately and linearly representative of the applied weight.

In accordance with the invention, there is provided a rebalancing electromagnetic servo system, preferably in the form of an electromagnetic rebalancing scale, comprising an electromagnetic actuating device including relatively movable field and armature members, at least one of which has an exciting winding. The system also includes a signal-control device having a movable element mechanically coupled to a movable member of the actuating device and an integrating device coupling the control device to such exciting winding to maintain the movable member in a predetermined equilibrium position. The system further includes means for modifying the signal input to the integrating device from the control device, the energization of the exciting winding being representative of the effect of the modifying means. When the system is embodied in a rebalancing scale, the means for modifying the signal input to the integrating device comprises weight-supporting means connected to the movable member and the actuating device. By the term "rebalancing" as applied to a servo system or scale is meant an apparatus which is, at equilibrium, always returned to the same zero or null position.

For a better understanding of the invention, together with other and further objects thereof, reference is had to the following description taken in connection with the accompanying drawing, while its scope will be pointed out in the appended claims.

Referring now to the drawing, the single figure represents, partially schematically, a complete rebalancing electromagnetic servo system embodying the invention and applied to an automatically indicating scale.

Referring now more specifically to the drawing, there is represented a rebalancing automatically indicating scale comprising an electromagnetic actuating device 10 including relatively movable field and armature members, at least one having an exciting winding. Specifically, the device 10 includes a stationary field member 10a having an exciting winding 10b and a movable magnetic armature member 10c. It is understood that the elements 10a and 10c are preferably of high permeability material having a low remanence and a low hysteretic constant, such as soft steel. The system also includes a signal-control device 11 having movable element mechanically coupled to the movable member of the actuating device. Specifically, the movable portion of the device 11 comprises a beam 11a pivoted at 11b and connected at one end to the movable armature 10c and having at its opposite end an electromagnetic pick-up device responsive to the position of the beam. This pick-up device comprises a sector-shaped armature 11c forming the opposite end of the beam 11a and means for developing a periodic output signal varying in phase with variations in the sense of the deviation of the movable beam 11a from a predetermined normal or balanced position. The signal-developing means comprises a normally balanced E-magnet 11d having an exciting winding 11e mounted on its center leg and connected to suitable alternating-current supply terminals 12. The magnet 11d also includes a pair of pick-up windings 11f and 11g disposed on the outer legs of the E-magnet and connected in series opposition.

The servo system further includes an integrating device coupling the control device 11 to the exciting winding 10b of the actuating device 10 to maintain the movable scale beam 11a in a predetermined equilibrium or balanced position. This integrating device includes a sensing circuit 13 for developing a unidirectional signal varying in polarity with the phase of the output signal of the control device 11. The circuit 13 is provided with input terminals 13a, 13a, connected to the pick-up windings of the control device 11 through an amplifier 9 which may be of conventional design and also energized from the supply circuit terminals 12. The input terminals 13a, 13a are connected to the primary winding of a transformer 14 having secondary windings 14a and 14b for developing signals of opposite polarity. The sensing circuit 13 comprises essentially a bridge circuit, one branch of which includes the winding 14a, a diode rectifier 15a, and a secondary winding 16a of a transformer 16, the primary winding of which is energized from the supply circuit terminals 12, and a load circuit comprising a resistor 17a and a shunt filter condenser 18a. The other branch of the bridge circuit similarly comprises winding 14b, a diode rectifier 15b, secondary winding 16b of transformer 16, and load resistor 17b shunted by filter condenser 18b. The algebraic sum of the unidirectional signal potentials appearing across resistors 17a and 17b in series is applied to the output terminals 13b, 13b of the sensing circuit 13.

The integrating device of the servo system also includes an integrating condenser 19 and a pair of normally nonconductive devices, such as the triode vacuum-tube impedances 20 and 21, connected individually to charge and discharge, respectively, the condenser 19 from a suitable source, such as the ±B supply circuit terminals 22. The tube 20 is provided with an anode load resistor 23, while the tube 21 is provided with a cathode load resistor 24. The tubes 20 and 21 and their respective load resistors 23 and 24 are preferably so proportioned that, when connected across the supply terminals 22 and with no signals applied to their control grids the terminal 25 common to the cathode of tube 20 and the anode of tube 21 is normally approximately at unidirectional ground potential and the circuit described is symmetrical with respect to ground. Suitable signal by-pass condensers 26 and 27 may be connected between the ±B terminals and ground.

The automatically indicating scale further includes means for energizing the exciting winding 10b of the actuating device 10 in accordance with the charge on the condenser 19. This means may comprise a cathode-follower repeater comprising a triode vacuum tube 28 having its control electrode connected to the ungrounded terminal of condenser 19 and provided with a cathode load resistor 29, the anode of the tube 28 being energized from a suitable source +B. The signal appearing across the resistor 29 is applied to input terminals 30a of a power amplifier 30 having output terminals 30b connected to the exciting winding 10b of actuating device 10. The power amplifier 30 is also energized from supply circuit terminals 12.

The system further includes means for modifying the signal input to the integrating device from the control device 11. Specifically, this modifying means is a force-applying means such as a weight-supporting platform 31, hung or suitably connected to and supported by the movable armature 10c. The platform 31 is adapted to support any object 32 to be weighed. With this arrangement, as explained in more detail hereinafter, the energization of the exciting winding 10b is representative of the effect of the above-described modifying means, that is, of the weight of the object 32. Therefore, the system also includes means responsive to the energization of the exciting winding 10b for developing such a representative effect. This responsive means may be in the form of a current-indicating means or ammeter 33 connected in series with the exciting winding 10b and having a movable pointer 33a and associated scale 33b calibrated to develop an indication of the magnitude of the modifying action, that is, of the force applied to, or the weight of, the object 32, on the supporting platform 31.

It is believed that the operation of the above-described automatically indicating rebalancing scale will be clear from the foregoing description. In brief, it will be assumed that the system is initially balanced in the absence of the object 32 to be weighed and that sufficient current is flowing in the exciting winding 10b to compensate for any unbalance in the movable scale beam 11a and its connected elements to maintain the beam in its neutral or balanced position. Under these conditions, the armature 11c of the signal-control device effects an equal coupling between the exciting winding 11e and the two pick-up windings 11f and 11g. Due to their connection in series opposition, the resultant signal supplied by these windings to the amplifier 9 is zero. Therefore, no signal is applied by the transformer 14 to the two arms of the bridge circuit, while equal signals are supplied by the transformer 16 to the two branches of the bridge circuit, and equal and opposite unidirectional signals appear across the load circuits 17a, 18a and 17b, 18b under these conditions. The circuit constants are so proportioned that, with these signals, the grids of the vacuum tubes 20 and 21 are biased slightly beyond cutoff so that these tubes are nonconductive and constitute essentially infinite impedance devices. Therefore, the terminal 25 connected to the ungrounded terminal of condenser 19 is substantially electrically isolated and any charge existing on the condenser 19 is maintained with inappreciable leakage. Therefore, the signal developed across the load resistor 29 of repeater tube 28 is also maintained constant and similarly the excitation of the winding 10b, thereby to maintain the system in equilibrium. For these conditions the scale 33b is calibrated to read zero.

If now a force be applied to the platform 31, as by the disposition of an object 32 thereon, the scale beam 11a becomes unbalanced, deflecting in a clockwise direction. The armature 11c thus increases the coupling between the exciting winding 11e and the pick-up winding 11f and decreases that between the windings 11e and 11g, thus applying to the amplifier 9 a signal of a predetermined polarity. This signal is amplified in amplifier 9 and applied to the sensing circuit 13. The transformer 14 applies this signal with one polarity to the branch of the bridge circuit including the rectifier 15a and with opposite polarity to the branch of the circuit including rectifier 15b. The phase connections are such that this signal adds to that supplied by the transformer 16 in the upper branch of the bridge circuit and subtracts from that supplied by the transformer 16 in the lower branch of the bridge circuit. Thus, the unidirectional potential appearing across the load circuit 17a, 18a increases positively, while that appearing across the load circuit 17b, 18b decreases positively. Therefore, the repeater tube 20 is rendered conductive but there is no effect upon the tube 21, the grid of which is made more negative, since this tube is already nonconductive. As the tube 20 becomes conductive, the integrating condenser 19 is charged therethrough from the source +B so that the terminal 25 becomes more positive. The charging of the condenser 19 continues as long as there is any unbalance of the scale beam 11a and the final charge of condenser 19 is proportional to the time-integral of the signal output from the device 11 applied to the amplifier 9. Therefore, the grid of the repeater tube 28 is also made more positive to increase its conductivity and to increase the signal developed across the resistor 29 and applied to the power amplifier 30. The signal output of the amplifier 30 is correspondingly increased to increase the energization of the exciting winding 10b of the actuating device 10 and this operation continues until the energization of this winding is sufficient to overcome the effect of the weight 32 and to attract the armature 10c back to its normal or balanced position. When this condition occurs, the control system described becomes inoperative, as explained above, and the new value of charge on the condenser 19 and the new value of energization of exciting winding 10b are maintained.

The current indicator 33 in series with the winding 10b indicates on its calibrated scale 33b the weight of the object 32. Obviously, if the object 32 is removed or another object of lesser weight is substituted the reverse of the operation just described takes place, reducing the energization of the winding 10b and the indication of the meter 33.

Thus it is seen that, in the automatically indicating rebalancing scale of the invention including the integrating feature, the system is rebalanced only when the scale beam 11a is in exactly the neutral or balanced position and that this balance is maintained until disturbed by the change of the weight of the object 32, no control signal from the device 11 being required to maintain the system in its new condition of balance. Thus, the system has a zero regulation characteristic and its accuracy is determined solely upon the sensitivity of the various electrical responsive and actuating devices.

While there has been described what is at present considered to be the preferred embodiment of the invention, it will be apparent to those skilled in the art that various changes and modifications may be made therein without departing from the invention, and it is, therefore, aimed in the appended claims to cover all such changes and modifications as fall within the true spirit and scope of the invention.

What is claimed is:

1. A rebalancing electromagnetic servo system comprising, an electromagnetic actuating device including relatively movable field and armature members at least one having an exciting winding, a signal-control device having a movable element mechanically coupled to a movable member of said actuating device, an integrating device coupling the signal output of said control device to said exciting winding to maintain said movable member in a predetermined equilibrium position, and means acting upon said control device for changing its signal output applied to said integrating device, the energization of said exciting winding being representative of the effect of said last-named means.

2. A rebalancing electromagnetic servo system comprising, an electromagnetic actuating device including a stationary field member having an exciting winding and a movable armature, a signal-control device having a movable element mechanically coupled to said movable member of said actuating device, an integrating device coupling said control device to said exciting winding to maintain said movable member in a predetermined equilibrium position, and means acting upon said control device for changing its signal output applied to said integrating device, the energization of said exciting winding being representative of the effect of said last-named means.

3. A rebalancing electromagnetic servo system comprising, an electromagnetic actuating device including relatively movable field and armature members at least one having an exciting winding, a signal-control device including a pivoted beam connected at one end to a movable member of said actuating device and an electromagnetic pick-up device responsive to the position of said beam, an integrating device coupling said control device to said exciting winding to maintain said movable member in a predetermined equilibrium position, and means acting upon said control device for changing its signal output applied to said integrating device, the energization of said exciting winding being representative of the effect of said last-named means.

4. A rebalancing electromagnetic servo system comprising, an electromagnetic actuating device including relatively movable field and armature members at least one having an exciting winding, a signal-control device including a pivoted beam connected at one end to a movable member of said actuating device and an armature member connected to the other end thereof and a normally balanced electromagnetic pick-up device having pick-up winding means associated therewith, an integrating device coupling said control device to said exciting winding to maintain said movable member in a predetermined equilibrium position, and means acting upon said control device for changing its signal output applied to said integrating device, the energization of said exciting winding being representative of the effect of said last-named means.

5. A rebalancing electromagnetic servo system comprising, an electromagnetic actuating device including relatively movable field and armature members at least one having an exciting winding, a signal-control device including a pivoted beam connected at one end to a movable member of said actuating device and an armature member connected to the other end thereof and an E-magnet pickup comprising an exciting winding and a pair of pick-up windings connected in series opposition, an integrating device coupling said control device to said exciting winding of said actuating device to maintain said movable member in a predetermined equilibrium position, and means acting upon said control device for changing its signal output applied to said integrating device, the energization of said exciting winding of said actuating device being representative of the effect of said last-named means.

6. A rebalancing electromagnetic servo system comprising, an electromagnetic actuating device including relatively movable field and armature members at least one having an exciting winding, a signal-control device having a movable element mechanically coupled to a movable member of said actuating device and means for developing a periodic output signal varying in phase with variations in the sense of the deviation of said movable member from a predetermined normal position, an integrating device responsive to said output signal and including an integrating condenser, a pair of normally nonconductive devices connected individually to charge and discharge said condenser, and a circuit for selectively rendering said devices conductive in accordance with the phase of the output signal of said control device, and means for energizing said exciting winding in accordance with the charge on said condenser to maintain said movable member in a predetermined equilibrium position, and means acting upon said control device for changing its signal output applied to said integrating device, the energization of said exciting winding being representative of the effect of said last-named means.

7. A rebalancing electromagnetic servo system comprising, an electromagnetic actuating device including relatively movable field and armature members at least one having an exciting winding, a signal-control device having a movable element mechanically coupled to a movable member of said actuating device and means for developing a periodic output signal varying in phase with variations in the sense of the deviation of said movable member from a predetermined normal position, a sensing circuit for deriving a unidirectional control signal varying in polarity with the phase of said output signal, an integrating device coupling said sensing circuit to said exciting winding to maintain said movable member in a predetermined equilibrium position, and means acting upon said control device for changing its signal output applied to said integrating device, the energization of said exciting winding being representative of the effect of said last-named means.

8. A rebalancing electromagnetic servo system comprising, an electromagnetic actuating device including relatively movable field and armature members at least one having an exciting winding, a signal-control device having a movable element mechanically coupled to a movable member of said actuating device, an integrating device coupling said control device to said exciting winding to maintain said movable member in a predetermined equilibrium position, means acting upon said control device for changing its signal output applied to said integrating device, and means responsive to the energization of said exciting winding for developing an effect representative of the action of said last-named means.

9. A rebalancing electromagnetic servo system comprising, an electromagnetic actuating device including relatively movable field and armature members at least one having an exciting winding, a signal-control device having a movable element mechanically coupled to a movable member of said actuating device, an integrating device coupling said control device to said exciting winding to maintain said movable member in a predetermined equilibrium position, means acting upon said control device for changing its signal output applied to said integrating device, and current-indicator means connected in series with said exciting winding for developing an indication of the magnitude of the action of said last-named means.

10. An electromagnetic rebalancing force-measuring apparatus comprising, an electromagnetic actuating device including relatively movable field and armature members at least one having an exciting winding, a signal-control device having a movable element mechanically coupled to a movable member of said actuating device, an integrating device coupling said control device to said exciting winding to maintain said movable member in a predetermined equilibrium position, and force-applying means connected to said movable member of said actuating device, the energization of said exciting winding being representative of the force on said force-applying means.

11. An electromagnetic rebalancing scale comprising, an electromagnetic actuating device including relatively movable field and armature members at least one having an exciting winding, a signal-control device having a movable element mechanically coupled to a movable member of said actuating device, an integrating device coupling said control device to said exciting winding to maintain said movable member in a predetermined equilibrium position, and weight-supporting means connected to said movable member of said actuating device, the energization of said exciting winding being representative of the weight on said supporting means.

12. An electromagnetic rebalancing scale comprising, an electromagnetic actuating device including relatively movable field and armature members at least one having an exciting winding, a signal-control device having a movable element mechanically coupled to a movable member of said actuating device, an integrating device coupling said control device to said exciting winding to maintain said movable member in a predetermined equilibrium position, weight-supporting means connected to said movable member of said actuating device, and current-indicator means connected in series with said exciting winding for developing an indication of the weight on said supporting means.

WILLIAM W. SHANNON.

REFERENCES CITED

The following references are of record in the file of this patent:

UNITED STATES PATENTS

| Number | Name | Date |
|---|---|---|
| 1,921,983 | Wittkuhns | Aug. 8, 1933 |
| 2,067,741 | Weckerly | Jan. 12, 1937 |
| 2,117,894 | Lenehan | May 17, 1938 |
| 2,136,219 | Scherbatskoy | Nov. 8, 1938 |
| 2,371,040 | Fisher et al. | Mar. 6, 1945 |